United States Patent Office 3,186,796
Patented June 1, 1965

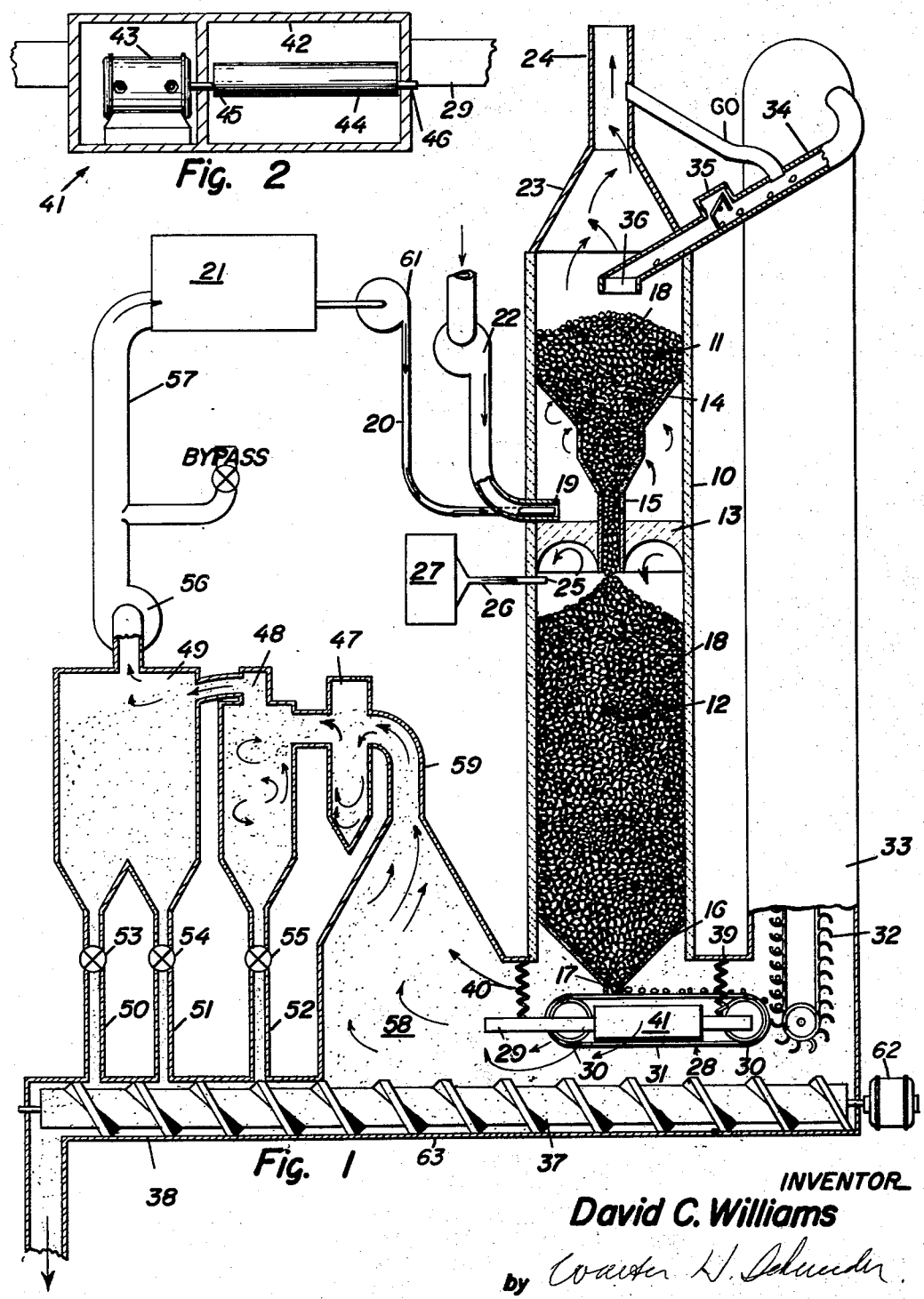

3,186,796
PRODUCTION OF CARBON BLACK AND
APPARATUS THEREFOR
David C. Williams, Aransas Pass, Tex., assignor, by mesne assignments, to Ashland Oil & Refining Company, Ashland, Ky., a corporation of Kentucky
Filed Oct. 18, 1961, Ser. No. 145,837
17 Claims. (Cl. 23—209.4)

This invention relates to the manufacture of carbon black. More particularly it relates to a improved process for the manufacture of carbon black by the pyrolysis of a hydrocarbon feedstock which involves the use of a contiguous mass of flowable pebbles.

As is well known in the art, carbon black in its various grades is produced by several different processes using different types of apparatus. The present invention is concerned with the production of thermal blacks and, specifically, with the use in such production of a pebble heater. Such a device has heretofore been used for the heating and/or reaction of fluids and, in general, comprises a heating chamber or zone communicating with a contact or reaction chamber or zone. The heating chamber is further provided with refractory pebble inlet means for heating a mass of refractory pebbles and a flue for discharging combustion products. The reaction chamber is further provided with inlet means for a fluid feedstock to be treated and refractory pebble and product discharge means. Such devices are also provided with means for continuously recirculating the pebbles from the reaction chamber to the heating chamber. In practice, a mass of pebbles continuously moves through the device from the heating chamber to the reaction chamber, discharging from the reaction chamber to be recirculated to the heating chamber. The intercommunicating voids thus created throughout the hot mass as it passes through the reaction chamber provide a multitude of tortuous paths through which the feedstock fluid, continuously introduced into the reaction chamber, swirls while absorbing heat from the pellets finally to be discharged along with the pellets.

The mass of hot refractory pebbles in the reaction chamber of a pebble heater provides an environment which is ideal for the cracking of a hydrocarbon feedstock. Therein the feedstock may be heated rapidly to a temperature of 1500° F. or higher, in the absence of flame and air. Under these conditions, hydrocarbon gas or vapors will spontaneously decompose, producing carbon, hydrogen and, under certain conditions, some hydrocarbon by-product gases. Production systems employing pebble heaters have found some favor in the past as a means of cracking hydrocarbons because of the rapid heating that can be achieved, because of the convenience of conducting continuous processes therein, and because of other advantages well known to those skilled in the art. Despite the advantages of pebble heaters, their use for the direct production of carbon black as a primary product has been limited, their main utilization having been for the production of hydrogen and/or lighter petroleum fractions, with carbon black appearing as a by-product in limited yield. While such systems in various forms have been proposed specifically for the production of carbon black, they have not been commercially adopted throughout the carbon black industry for any of various reasons.

It is a principal object of this invention to continuously produce carbon black in a system employing a pebble heater. It is a further object of this invention to provide such a system which is not subject to the various disadvantages of previous systems of this type. A still further object of this invention is to provide a pebble heater system for producing carbon black in which carbon black produced in a pebble heater is more efficiently removed therefrom resulting in an improved yield. Other objects will be apparent on a reading of the disclosure.

These various objects have been met in a surprisingly effective manner. In general, the system involving the process and apparatus of this invention comprises a pebble heater having heating and reaction chambers or zones, through which continuously moves a mass of refractory pebbles heated to the thermal decomposition temperature of a feedstock introduced into the voids of said mass. The bottom of the pebble heater is provided with a discharge outlet for discharging cooled refractory pebbles and thermal decomposition products. This outlet communicates with and is enclosed by a quiescent carbon black separation chamber in which is located vibrating transport means adapted to continuously receive discharged carbon black-laden refractory pebbles, dislodge the carbon black therefrom, and return the pebbles to the heating chamber. The carbon black separation chamber, in addition, is in communication with collection equipment in which the reaction products, including the carbon black, may be collected and recovered.

As used throughout the specification and claims, the term "pebble" denotes any solid refractory material of flowable form and size that can be used as a heat exchange medium. Such pebbles are preferably spherical and have been used heretofore for various purposes in sizes ranging from about $\frac{1}{32}$–1 inch in diameter. The usefulness of the present invention, however, is not necessarily limited to pebbles within the aforesaid size range and, in fact, a preferred embodiment is to employ pebbles of a size range of about 2–3 inches in diameter and even larger, under which conditions a larger void volume to surface area ratio is provided. The pebbles may be formed of any refractory material that will withstand a temperature at least as high as the highest temperature attained in the system without melting or disintegrating. In addition, the refractory pebbles must be such as will withstand mild abrasion, mechanical shocks and temperature change to which they may be subjected to in the system. Various refractory materials such as metal alloys, ceramics, and the like, may be readily utilized. For example, ceramics, alumina, periclase, thoria, beryllia and mullite may be used separately or in admixture to form pebbles which when properly fired will withstand temperatures up to 3500° F.

The invention may be better understood by reference to the accompanying drawings in which:

FIGURE 1 is a diagrammatic illustration of the system including the pebble heater, vibrator mechanism and carbon black collection equipment. It is partly sectional and partly broken out in order that certain aspects may be more clearly revealed.

FIGURE 2 is a sectional detail view of the vibrator mechanism.

FIGURE 1 shows a pebble heater comprising tubular refractory lining 10, divided into a heating chamber 11 and a subjacent contact or reaction chamber 12 by means of a tubular refractory plate 13. Provided in heating chamber 11 is a tubular refractory grate 14, the upper extremity of which contacts the refractory lining 10 of the heating chamber and the middle portion of which is of reduced cross section. The lower extremity of the grate 14 is of still smaller cross section in order that it may be coupled with the upper end of a pebble conduit 15 which passes downward through refractory plate 13 into the reaction chamber and is of smaller diameter than either of the aforesaid chambers. At the bottom of the reaction chamber is a second grate 16 resembling an inverted hollow frustum whose lower end constitutes discharge outlet 17 for the discharge of the pebbles from the reaction chamber 12.

Within the chambers 11 and 12 is provided a contiguous mass 18 of refractory pebbles. In heating chamber 11 the pebbles are supported on the grate 14, while in the reaction chamber 12 they are supported on the grate 16. The relative diameters of the pebbles and of conduit 15 and outlet 17 should be such as to insure that the conduit and outlet will be sufficient filled up with pebbles residing temporarily therein as to constitute partial closure members therefor. The upwardly facing, sloping surfaces of the grates 14 and 16 should be at an angle to the horizontal which exceeds the angle of repose of the pebbles, so that the latter will readily flow from the chambers without bridging.

The outlet of a burner 19 for providing hot combustion gases is directed into that space in heating chamber 11 which is defined by the interior of the refractory lining 10, the top of plate 13 and the exterior of the grate 14. The burner is connected through a fuel line 20 and blower 61 to a fuel reservoir 21. The burner is also connected to a suitable source, not shown, of oxygen through a blower 22. The closed roof 23 of the chamber 11 is provided with a flue or chimney 24 for the removal of combustion products created by the combustion of the fuel. A feedstock injector 25 is located inside the chamber 12 adjacent the lower surface of plate 13. The injector is connected through the lining 10 by a feedstock pipe 26 to a suitable source 27 of hydrocarbon feedstock. The fact that the pebbles tend to seek an angle of repose as illustrated, taken together with the particular positionings of feedstock injector 25 and the pebble conduit 15, provide free space for the circulation of feedstock prior to its entry into the pebble mass.

Beneath the outlet 17 is situated the pick-up end of an agitated transport means 28 illustrated as a conveyer having side frames 29, revolving drums 30 and a belt 31. The belt is preferably of flexible mesh, although other rough materials may as readily be employed. The conveyor is provided with flexible mountings 39 and 40 associated with vibrator means 41. FIGURE 2 illustrates vibrator means 41 in more detail, depicting it as comprising a housing 42 attached to frame 29 of the transport means. An air motor 43 situated within said housing driving shafts 45, 46 carrying eccentric 44. Mountings 39 and 40 are illustrated as coil springs, but may be constructed in any suitable manner of suitable material. Basically, they should be flexible enough to permit movement of the conveyor in response to the action of the vibrator and should be made of a material which resists crystallization and metal fatigue.

The take-off end of conveyor 28 is adjacent the pick-up point of a pebble recirculating means comprising vertical bucket conveyor 32 housed in a vertical enclosure 33. The bucket conveyer empties into a chute 34 containing a gas lock 35. The chute 34 passes through the lining 10 into the heating chamber 11 and has an outlet 36 just above the surface of the pebble mass 18. Any small amounts of gas which succeed in passing through the gas lock are vented through gas vent 60 which connects the upper portion of chute 34 to the chimney 24.

Enclosing the outlet 17 of the reaction chamber and the conveyor 28 and in communication with the vertical bucket conveyor enclosure is a large quiescent carbon black separation chamber 58. Chamber 58 is provided with a hopper-type bottom 63 provided with a motor (62)-driven screw conveyer 37 communicating with a discharge pipe 38 communicating with packaging, pelletizing and storage facilities, not shown. In the top of chamber 58 is a duct 59 connected to conventional carbon black collection equipment, such as cooler 47, cyclone 48 and bag filter 49. The solid product outlets of the cyclone and bag filter may be connected to the product pipe 38 by headers 50, 51 and 52 which are provided with rotary air-lock type valves 53, 54 and 55. The gas outlet of the bag filter is provided with a blower 56 which communicates with gas reservoir 21 by means of conduit 57.

When the reactor is in operation, the mass of refractory pellets 18 is in constant circulation. Transport means 28 removes pebbles from the reaction chamber at outlet 17 and conveys them to the bucket elevator 32 which raises them to a point above the top of the heating chamber. While pebbles are being removed from the outlet 17, the pebbles remaining in the chamber 12 gravitate, allowing more pebbles to enter reaction chamber 12 from heating chamber 11 through conduit 15. As pebbles gravitate from chamber 11 through conduit 15 to chamber 12, the top of the mass sinks downward in chamber 11. This makes room for the pebbles elevated by the bucket conveyer to enter chamber 11 via chute 34 and gas lock 35. Thus, it will be observed that pebbles are continuously circulated from the reaction chamber outlet to the transport means, from the transport means to the heating chamber, from the heating chamber to inside the reaction chamber and from inside the reaction chamber to the reaction chamber outlet.

While the pebbles are thus being circulated, those in heating chamber 11 are being subjected to direct contact with hot products of combustion. Fuel from the fuel line 20 and oxygen from the blower 22 are ignited in burner 19 and form hot combustion products which swirl about the outside of grate 14, through its perforations, upwardly through the mass 18 inside chamber 11 and finally exit through the chimney 24. Combustion should be maintained at a level which will maintain a pebble temperature of about 2300° F. as the pebbles enter the reaction chamber 12.

The hot pebbles entering reaction chamber 12 are sprayed with a hydrocarbon feedstock introduced through feedstock injector 25 which decomposes spontaneously, yielding carbon black and byproduct gases. Location of the injector 25 at the top of reaction chamber 12 brings about a concurrent flow of pebbles and gas which directs the carbon black and gaseous products away from instead of towards the heating chamber as is the case in prior art pebble heater systems reactors. Accordingly, instead of being drawn upwardly into the heating zone and being destroyed, the gaseous products with entrained carbon black travel through the tortuous passages between the pebbles and through the perforations in grate 16 into the quiescent chamber 58. The gaseous products, and any carbon black which does not adhere to the refractory pebbles or fall to the bottom of chamber 58, are drawn from chamber 58 to the collection equipment in which the carbon black and gaseous products are separated and routed to their respective storage reservoirs. The gaseous products are drawn off by blower 56 and are propelled through conduit 57 to the gas reservoir 21, from which they may be recycled to the process as fuel for the burner 19. The carbon black is drawn off through headers 50, 51 and 52 by rotation of valves 53, 54 and 55 and travels through the pipe 38 to storage or to other further processing.

A significant proportion of the carbon black produced in the reaction chamber adheres to the refractory pebbles. Heretofore in carbon black pebble heater systems, this carbon black has not been recovered to any extent but instead has been destroyed by combustion on recirculation of the pebbles to the heating chamber. In accordance with the present invention, however, carbon black-laden pebbles discharged from the reaction chamber are picked up on transport means 28 and while traveling thereon are subjected to a continuous vibration transmitted to them from the vibrator means 41. The resulting abrasive action removes substantially all the adhered carbon black from the pebbles by the time they reach the bucket conveyer. The clean pebbles are then returned to the heating chamber by the bucket conveyer while the dislodged carbon black is collected either through the collection equipment and/or screw conveyer 37.

Thus it is a feature of this invention that a higher yield of carbon black is achieved by providing a reaction chamber with an injector mounted near the top thereof which brings about a resultant flow of reaction products in a direction away from the heating chamber. An additional feature of this invention is the further increase in yield obtained by the efficient recovery of carbon black adhering to the pebbles and which has heretofore been substantially completely lost. A still further feature of this invention is the preferred use of refractory pebbles of a diameter of 2–3 inches and greater thus providing a greater void volume to surface area ratio resulting in a surprisingly more efficient conversion of feedstock to carbon black. An additional feature of this invention is the provision of a large quiescent chamber which encloses the reaction chamber outlet and transport means, making the collection of the carbon black product more efficient.

Air, oxygen-enriched air or oxygen may be used to support combustion of the fuel which may be any fuel capable of providing the decomposition temperature. The hydrocarbon feedstock may be natural gas or pure methane, ethane or relatively low molecular weight petroleum fractions, such as tail gas, used in admixture with or in substitution for natural gas. Diluent gases may also be mixed with the feedstock to vary the properties of the carbon black product.

It will be easily understood by those skilled in the art that it is possible to modify and/or add to the specific embodiment given above without departing from the spirit of the invention. For example, the chimney may be provided with a heat exchanger to preheat the fuel and air for the burner 19. Changes may be made in the temperature ranges specified herein in order to adapt the apparatus and process of the invention to treatment of varying feedstocks. In addition, various expedients such as means to vary the speed at which the refractory pebbles circulate and means to vary the pressure in the heating chamber in order to prevent the transfer of product from the reaction chamber to the heating chamber may be practiced. While the transport means has been illustrated herein as a belt type conveyer, those skilled in the art relating to material handling are aware of other varieties of transport means, such as vibrating screens, chutes, tubes, etc., which could be adapted to serve as transport means in accordance with this invention. It may also be found desirable in the practice of this invention to provide guard rails to maintain the refractory pebbles on the transport means, to alter the means utilized herein for the suspension of the transport means or to alter the vibration means and its manner of attachment to the transport means.

I claim:

1. A continuous process for preparing carbon black by the thermal decomposition of a hydrocarbon feedstock which comprises: impinging hot combustion gases upon a particulate solid heat exchange mass in a heating zone to heat said mass to a temperature sufficient to decompose said hydrocarbon feedstock; passing said particulate mass into one end of a reaction zone which is in communication with said heating zone; injecting said hydrocarbon feedstock into said one end of said reaction zone; passing said feedstock and said particulate mass concurrently through said reaction zone whereby said feedstock is caused to flow away from said heating zone and through the voids in said particulate mass wherein it is converted with evolution of gases to carbon black, a portion of which adheres to said particulate mass; discharging the resultant carbon black-bearing gases and the carbon black-bearing particulate mass from said reaction zone into a carbon black separation zone; separating the carbon black from said gases; removing the adherent carbon black from said particulate mass by subjecting particles of said particulate mass to sustained vibration in said carbon black recovery zone; and returning said particulate mass to said heating zone.

2. A pebble heater system for the continuous production of carbon black by thermal decomposition of a hydrocarbon feedstock which comprises: a heating chamber communicating with a reaction chamber through a pebble conduit; a pebble inlet near the top of said heating chamber; means for producing in said heating chamber a hydrocarbon decomposition temperature; a hydrocarbon feedstock injector near the top of said reaction chamber; a pebble and reaction product discharge outlet at the bottom of said reaction chamber; a mass of pebbles situated in said chambers and in said pebble conduit; said pebbles being capable of flowing from said heating chamber through said pebble conduit to said reaction chamber and through said pebble discharge outlet; said outlet opening into a carbon black separation chamber; vibratory transport means in said carbon black separation chamber adjacent said pebble outlet for receiving discharged pebbles; said vibratory transport means being adapted to treat pebbles discharged from said outlet by means of sustained vibration and abrasion to remove adherent carbon black therefrom; means associated with said carbon black separation chamber for recovering carbon black therefrom; and means in communication with said pebble inlet and in pebble-receiving relationship with said vibratory transport means, for recirculating pebbles from said carbon black separation chamber to said heating chamber.

3. A system according to claim 2 wherein said vibratory transport means includes a motor-driven eccentric weight contained within a housing attached to said vibratory transport means.

4. A system according to claim 2 wherein said vibratory transport means includes a conveyor having an endless moving belt for engaging said pebbles.

5. Apparatus according to claim 4 wherein said belt is a web of wire mesh.

6. A pebble heating system for the continuous production of carbon black which comprises: a vertical tubular heating chamber separated from a subjacent tubular reaction chamber by a plate provided with a pebble conduit of smaller diameter than either chamber affording communication therebetween; said heating chamber being provided with a vertical tubular grate whose upper end contacts the tubular wall of said heating chamber and whose lower end communicates with said pebble conduit; a pebble inlet at the top of said heating chamber; a heating means at the bottom of said heating chamber; means at the top of said reaction chamber for introducing a hydrocarbon feedstock; said reaction chamber being provided at its lower end with a perforated bottom in the form of an inverted frustum for discharging pebbles and reaction products; said reaction chamber communicating through said perforated bottom with a carbon black separation chamber; vibratory transport means in said carbon black separation chamber adjacent said perforated bottom in pebble-receiving relationship therewith; means associated with said carbon black separation chamber for recovering carbon black therefrom; and means in communication with said pebble inlet and in pebble-receiving relationship with said vibratory transport means for recirculating pebles from said carbon black separation chamber to said heating chamber.

7. A process for preparing carbon black by decomposition of a hydrocarbon feedstock, which comprises: heating pebbles in a heating zone to a temperature sufficient to decompose said hydrocarbon feedstock; conducting the heated pebbles to a reaction zone to provide therein a hot mass of pebbles having intercommunicating voids forming a multitude of tortuous paths through said reaction zone; introducing said hydrocarbon feedstock into said reaction zone and passing it through said tortuous paths, whereby gaseous material and carbon black are produced, at least part of said carbon black adhering to said pebbles; conducting said pebbles with their adherent carbon black out of said reaction zone to a carbon black separation zone; subjecting said pebbles to vibration in said separation zone to dislodge and remove adherent carbon black from said pebbles; collecting and recovering the carbon black thus removed; and recycling said pebbles to said heating zone after the removal of adherent carbon black therefrom.

8. A process according to claim 7 wherein the feedstock and heated pebbles are introduced at the top of the reaction zone and the gaseous material and pebbles with adherent carbon black are removed from the bottom of the reaction zone.

9. A process in accordance with claim 7 wherein said carbon black separation zone is maintained in a quiescent condition, so that the carbon black present in said separation zone may fall to the bottom thereof.

10. A pebble heater system for the production of carbon black by decomposition of a hydrocarbon feedstock, which comprises: a heating chamber communicating with a reaction chamber through a pebble conduit; a pebble inlet near the top of said heating chamber; means for producing in said heating chamber a hydrocarbon decomposition temperature; means for injecting a hydrocarbon feedstock into said reaction chamber; a pebble and reaction product discharge outlet at the bottom of said reaction chamber; a carbon black separation chamber in communication with said discharge outlet; means associated with said carbon black separation chamber and in communication with said pebble inlet for returning pebbles from said carbon black separation chamber to said heating chamber, said last-mentioned means including vibratory transport means in said separation chamber in pebble-receiving position relative to said discharge outlet; said vibratory transport means being capable of treating pebbles discharged from said discharge outlet by means of sustained vibration to remove adherent carbon black therefrom; and means associated with said separation chamber for collecting and recovering carbon black therefrom.

11. Apparatus in accordance with claim 10 wherein the carbon black separation chamber is provided with a hopper-type bottom in which is a screw conveyor communicating with a discharge pipe.

12. Apparatus according to claim 10 wherein said vibratory transport means includes a rotatable eccentric weight and driving motor therefor contained within a housing attached to said transport means.

13. Apparatus according to claim 10 wherein said vibratory transport means is a conveyor having an endless belt for engaging said pebbles.

14. Apparatus according to claim 13 wherein said belt is a web of wire mesh adapted to abrade the pebbles carried thereon.

15. Apparatus in accordance with claim 10 wherein the means for collecting and recovering carbon black includes a cyclone separator.

16. Apparatus in accordance with claim 10 wherein the means for collecting and recovering carbon black includes a bag filter.

17. A pebble heater system for the production of carbon black by decomposition of a hydrocarbon feedstock, which comprises: a tubular heating chamber; a subjacent tubular reaction chamber; a tubular pebble conduit of smaller diameter than either of the aforesaid chambers affording communication therebetween; said heating chamber being in communication with burner means for providing hot combustion gases therein; means at the top of said reaction chamber for introducing a hydrocarbon feedstock therein; said reaction chamber being provided at its lower end with a perforated bottom including a discharge outlet for discharging pebbles and reaction products; said reaction chamber communicating through said discharge outlet with a carbon black separation chamber having a hopper-type bottom; vibratory transport means in said separation chamber above the bottom thereof in pebble-receiving position relative to said discharge outlet, said vibratory transport means being capable of treating pellets discharged from said discharge outlet by means of sustained vibration and abrasion to remove adherent carbon black therefrom; a discharge pipe at the bottom of said carbon black separation chamber for removing carbon black therefrom; means associated with said discharge pipe for conveying carbon black out of said chamber through said discharge pipe; a duct in communication with the top of said carbon black separation chamber; collection means, in communication with said duct, for withdrawing gaseous material and entrained carbon black from said carbon black separation chamber through said duct and for effecting separation thereof; and means, in association with said carbon black separation chamber in pebble-receiving relationship with respect to said vibratory transport means and in communication with said pebble inlet, for recirculating pebbles from said vibratory transport means to said heating chamber.

References Cited by the Examiner

UNITED STATES PATENTS

| | | |
|---|---|---|
| 2,389,636 | 11/45 | Ramseyer. |
| 2,518,842 | 8/50 | Weber _____ 23—284 |
| 2,647,041 | 7/53 | Robinson. |
| 2,699,380 | 1/55 | Kilpatrick _____ 23—284 |
| 2,699,986 | 1/55 | Buell et al. _____ 23—212 |
| 2,731,328 | 1/56 | Atkinson _____ 23—209.4 |

FOREIGN PATENTS 357,135    9/31    Great Britain.

MAURICE A. BRINDISI, *Primary Examiner.*